United States Patent
Zhang et al.

(10) Patent No.: US 10,954,085 B2
(45) Date of Patent: Mar. 23, 2021

(54) DISCHARGING DEVICE FOR VINASSE TANK

(71) Applicant: SOUTHWEST JIAOTONG UNIVERSITY, Sichuan (CN)

(72) Inventors: Zeqiang Zhang, Sichuan (CN); Mengke Xie, Sichuan (CN); Jin Jiang, Sichuan (CN); Yunpeng Li, Sichuan (CN); Junqi Liu, Sichuan (CN); Shasha Wang, Sichuan (CN); Wenming Cheng, Sichuan (CN)

(73) Assignee: SOUTHWEST JIAOTONG UNIVERSITY, Chengdu (CN)

( * ) Notice: Subject to any disclaimer, the term of this patent is extended or adjusted under 35 U.S.C. 154(b) by 0 days.

(21) Appl. No.: 16/740,472

(22) Filed: Jan. 12, 2020

(65) Prior Publication Data

US 2020/0339366 A1     Oct. 29, 2020

(30) Foreign Application Priority Data

Apr. 29, 2019   (CN) .......................... 201910354437.8

(51) Int. Cl.
*B65G 65/23* (2006.01)

(52) U.S. Cl.
CPC ........ *B65G 65/23* (2013.01); *B65G 2201/042* (2013.01)

(58) Field of Classification Search
CPC .......................... B65G 65/23; B65G 2201/042
See application file for complete search history.

(56) References Cited

U.S. PATENT DOCUMENTS

| | | | | |
|---|---|---|---|---|
| 593,680 A * | 11/1897 | Niebling | ................. | B65G 65/23 414/421 |
| 6,021,707 A * | 2/2000 | Bauer | ..................... | A47J 27/14 414/421 |
| 6,474,929 B1 * | 11/2002 | Hartman | ................. | B65G 65/23 414/422 |
| 6,644,907 B1 * | 11/2003 | Pinder | ................... | B65G 65/23 414/424 |
| 6,702,543 B1 * | 3/2004 | Barani | ................... | B65G 65/23 414/419 |
| 10,494,202 B2 * | 12/2019 | Meyer | ................... | B65G 65/24 |

(Continued)

FOREIGN PATENT DOCUMENTS

CN      107364734 A      11/2017
CN      208700088 U      4/2019

*Primary Examiner* — Kaitlin S Joerger (57) ABSTRACT

A discharging device for a vinasse tank, including a flipping component and a lifting component. The flipping component includes convex rods externally connected with opposite side surfaces of the tank, and a frame matched with the tank; the frame includes an outer frame and an inner frame; opposite inner supporting rods of the inner frame are provided with C-shaped grooves having openings downward and matched with the convex rods; respective C-shaped grooves include a through hole penetrating through lower parts of groove walls on both sides; a gear lever matched with the through hole and a first driving mechanism for driving the gear lever to move left and right axially along the through hole are arranged in the inner supporting rod; and a second driving mechanism for driving the inner frame to flip is arranged at a joint between the inner supporting rod and an outer supporting rod.

9 Claims, 9 Drawing Sheets

(56) References Cited

U.S. PATENT DOCUMENTS

| | | | |
|---|---|---|---|
| 2003/0198548 A1* | 10/2003 | Stewart | B65G 65/23 |
| | | | 414/425 |
| 2013/0167972 A1* | 7/2013 | Peressoni | B66C 1/625 |
| | | | 141/1 |
| 2013/0306589 A1 | 11/2013 | Miller | |
| 2020/0223668 A1* | 7/2020 | Powell | B66B 17/26 |

* cited by examiner

DISCHARGING DEVICE FOR VINASSE TANK

CROSS-REFERENCE TO RELATED APPLICATIONS

This application claims the benefit of priority from Chinese Patent Application No. 201910354437.8, filed on Apr. 29, 2019. The content of the aforementioned application, including any intervening amendments thereto, is incorporated herein by reference in its entirety.

TECHNICAL FIELD

The present invention relates to the technical field of vinasse charging, and particularly relates to a discharging device for a vinasse tank.

BACKGROUND OF THE PRESENT INVENTION

Vinasse, also known as red vinasse and fermented grain vinasse, is residue that remains after making wine by crops such as rice wheat. In the past, the vinasse was mainly used as livestock feed, and discarded at will, without further researching the practical value of the vinasse. With the development of science and technology, people discover more hidden value in the vinasse. For example, the vinasse can be used as fertilizer for agricultural production, and some scientific research institutions also find that some components in the vinasse can be used in health products and skin care products. Therefore, the in-depth research and utilization of the vinasse are gradually increased, and the potential practical value of the vinasse is also increasingly concerned. Most of the existing vinasse extraction processes rely on manual shoveling and loading to shovel the vinasse into a bucket truck, and then the bucket truck is transported to a discharge port to transfer the vinasse to a recovery tank through a loading truck. For existing loading trucks such as "a vinasse loading truck with clean unloading (Chinese utility model patent, publication number CN207435406U)" and "a vinasse loading truck used in a vinasse extraction process (Chinese utility model patent, publication number CN207390372U)", in practical use, the process of transporting the vinasse by the loading truck has the problem of spilling of the vinasse due to crawler vibration and manual shoveling process, thereby polluting the loading environment. At the same time, the process of manually transporting the vinasse to the loading truck may spill the vinasse due to shaking, and pollute a cellar; and the separate arrangement of the loading vehicle also consumes energy and labor, resulting in low resource utilization efficiency. In addition, because the vinasse has strong viscosity, part of the vinasse may be easily attached to the surface of a hopper due to inadequate discharging in the process of discharging by using the feeding truck, thereby causing inconvenience in cleaning and shortening the service life of the hopper.

SUMMARY OF THE PRESENT INVENTION

The main purpose of the present invention is to provide a discharging device for a vinasse tank, so as to solve the problems of spilling, dropping and inadequate discharging of vinasse in the prior art.

To achieve the above purpose, the present invention provides a discharging device for a vinasse tank. The discharging device for the vinasse tank includes a flipping component and a lifting component, wherein the flipping component includes a group of convex rods externally connected with a group of opposite side surfaces of a vinasse tank, and a frame matched with the shape of the vinasse tank; the frame includes an outer frame and an inner frame; a group of opposite inner supporting rods of the inner frame are provided with C-shaped grooves having openings downward and opening sizes matched with the convex rods; each of the C-shaped grooves includes a first through hole penetrating through the lower parts of the groove walls on both sides; a gear lever matched with the size of the first through hole and a first driving mechanism for driving the gear lever to move left and right along an axial direction of the first through hole are arranged in the inner supporting rod; and a second driving mechanism for driving the inner frame to flip is arranged at a joint between the inner supporting rod of the inner frame and an outer supporting rod of the outer frame.

Firstly, the lifting component is used for rising and falling. The transportation process is more stable than a charging vehicle, which can effectively overcome the problems of spilling and dropping of the vinasse and reduce the required manpower. Secondly, the flipping component can flip the vinasse tank by 180°, so that all the vinasse in the vinasse tank can be discharged, thereby not only prolonging the service life of the vinasse tank and saving the cleaning time, but also further reducing the manpower. The flipping component is provided with the first driving mechanism, which can quickly lock and unlock the vinasse tank. The structure is simple and the operation is convenient. It can be seen that the discharging device for the vinasse tank of the present invention can effectively solve the problems of spilling, dropping and inadequate discharging of the vinasse, save the manpower, and significantly increase the efficiency.

Further, the second driving mechanism includes a first supporting seat arranged on the inner supporting rod, a second supporting seat arranged on the outer supporting rod, and a second motor arranged on the outer supporting rod; the first supporting seat is provided with a keyway hole; the second supporting seat is provided with a through hole; and a transmission shaft of the second motor penetrates through the through hole and then is in key connection with the keyway hole. Thus, the structure is simple and the flipping process is smooth.

Further, the first driving mechanism includes a first sensor arranged on a top wall of the C-shaped groove, a controller and a second sensor and a first motor which are connected with the gear lever. The first sensor is preferably an infrared sensor or an ultrasonic sensor. When the first sensor detects the convex rod on the vinasse tank, the controller controls the first motor; and the first motor drives the gear lever to automatically pop out, so that the gear lever intersects with the convex rod, thereby realizing automatic locking. The second sensor is preferably a gravity sensor. When the vinasse tank discharges and then moves to the ground, a certain gap occurs between the convex rod and the gear lever. When the second sensor detects that the gear lever does not bear loads, the controller controls the first motor; and the first motor drives the gear lever to retract into the inner supporting rod for handling a next vinasse tank. Thus, the vinasse tank is automatically locked and unlocked without human operation, so that the efficiency is high and the cost is reduced.

Further, two first driving mechanisms and two C-shaped grooves are respectively arranged on the group of opposite inner supporting rods; and two groups of convex rods are arranged. Thus, the vinasse tank is evenly stressed, so that the vinasse tank is difficult to tip over in the hoisting process.

Further, the lifting component includes a large vehicle, a small vehicle, a sling connected with the outer frame, and a hoist for driving the sling to rise and fall. Thus, large-range hoisting is realized.

Further, the discharging device for the vinasse tank also includes an anti-shake device to prevent the vinasse tank from shaking in a lifting process. Thus, the lifting process and the handling process of the vinasse tank can be ensured to be relatively stable, thereby ensuring that the vinasse will not be spilled due to strong shaking.

Further, the anti-shake device is a telescopic connecting rod. Thus, the size is small and is convenient to observe the vinasse tank.

Further, an outer rod at a telescopic position of the telescopic connecting rod is provided with a plurality of buckle circles distributed along the axial direction of the outer rod; and an inner rod is provided with a plurality of convex balls distributed along the axial direction of the inner rod and matched with the buckle circles. Thus, adjustment of multiple heights can be realized, thereby accurately adjusting the height of the vinasse tank from the ground.

Further, the outer supporting rod is provided with at least two telescopic connecting rods. Thus, the stability of the vinasse tank in the lifting process and the handling process is further improved.

It can be seen that the discharging device for the vinasse tank of the present invention can effectively solve the problems of spilling, dropping and inadequate discharging of the vinasse, save the manpower, and significantly increase the efficiency.

The present invention is further described below in combination with the drawings and specific embodiments. Additional aspects and advantages of the present invention will be partially provided in the following illustration, will partially become apparent from the following illustration, or will be learned through the practice of the present invention.

BRIEF DESCRIPTION OF THE DRAWINGS

The drawings that form a part of the present invention are used to help to understand the present invention. The content provided in the drawings and the related illustration in the present invention can be used to explain the present invention, but do not form an improper limitation to the present invention. In the drawings.

LIST OF REFERENCE NUMERALS

Related reference numerals in the above drawings:

41—sling; 42—hoist; 43—telescopic connecting rod; 431—buckle circle; 432—convex ball; 5—frame; 51—outer frame; 511—outer supporting rod; 52—inner frame; 521—inner supporting rod; 522—gear lever- 61—first supporting seat; 62—second supporting seat; 63—keyway hole; 64—second motor; 65—transmission shaft; 7—first motor; 13—vinasse tank; 130—convex rod; 212—C-shaped groove; 2120—first through hole; 100—flipping component; 200—lifting component; 300—first driving component; 400—second driving component; 620—through hole; 4201—outer rod; 4202—inner rod; 11—small vehicle; 221—lower movable rod; 222—upper movable rod; 223—elastic component; 224—primary connecting rod; 225—secondary connecting rod; 226—driving gear; 227—driven acceleration gear; 228—straight toothed rod; 23—lower end pressure structure; 231—first matching end surface; 232—first strip-shaped hole; 24—upper end pressure structure; 241—second matching end surface; 2411—first oblique surface; 2412—vertical surface; 2413—second oblique surface; 242—second strip-shaped groove; 243—first critical point; 244—second critical point; 25—locking structure; 251—fixing part; 252—sleeve; and 253—convex strip.

DETAILED DESCRIPTION OF THE PRESENT INVENTION

The present invention will be clearly and completely illustrated below with reference to the drawings. Those ordinary skilled in the art can realize the present invention based on the illustration. Before the present invention is illustrated with reference to the drawings, it shall be especially noted that:

In the present invention, the technical solutions and technical features provided in each part including the following illustration can be combined with each other without conflict.

In addition, the embodiments of the present invention involved in the following illustration are generally only a part of the embodiments of the present invention, but not all of the embodiments. Therefore, based on the embodiments of the present invention, all other embodiments obtained by those ordinary skilled in the art without contributing creative labor shall belong to the protection scope of the present invention.

With respect to terms and units in the present invention, the terms "including", "having" and any variation thereof in the description, claims and related parts of the present invention are intended to cover non-exclusive inclusion.

Embodiment 1

A discharging device for a vinasse tank as shown in FIG. 1 to FIG. 6 includes a flipping component 100 and a lifting component 200.

The flipping component 100 includes two groups of convex rods 130 externally connected with a group of opposite side surfaces of a vinasse tank 13, and a frame 5 matched with the shape of the vinasse tank 13. The frame 5 includes an outer frame 51 and an inner frame 52. A group of opposite inner supporting rods 521 of the inner frame 52 are provided with two groups of C-shaped grooves 212 having openings downward and opening sizes matched with the convex rods 130. Each of the C-shaped grooves 212 includes a first through hole 2120 penetrating through the lower parts of the groove walls on both sides; a gear lever 522 matched with the size of the first through hole 2120 and a first driving mechanism 300 for driving the gear lever 522 to move left and right along an axial direction of the first through hole 2120 are arranged in the inner supporting rod 521; and a second driving mechanism 400 for driving the inner frame 52 to flip is arranged at a joint between the inner supporting rod 521 of the inner frame 52 and an outer supporting rod 511 of the outer frame 51.

Figure 1:
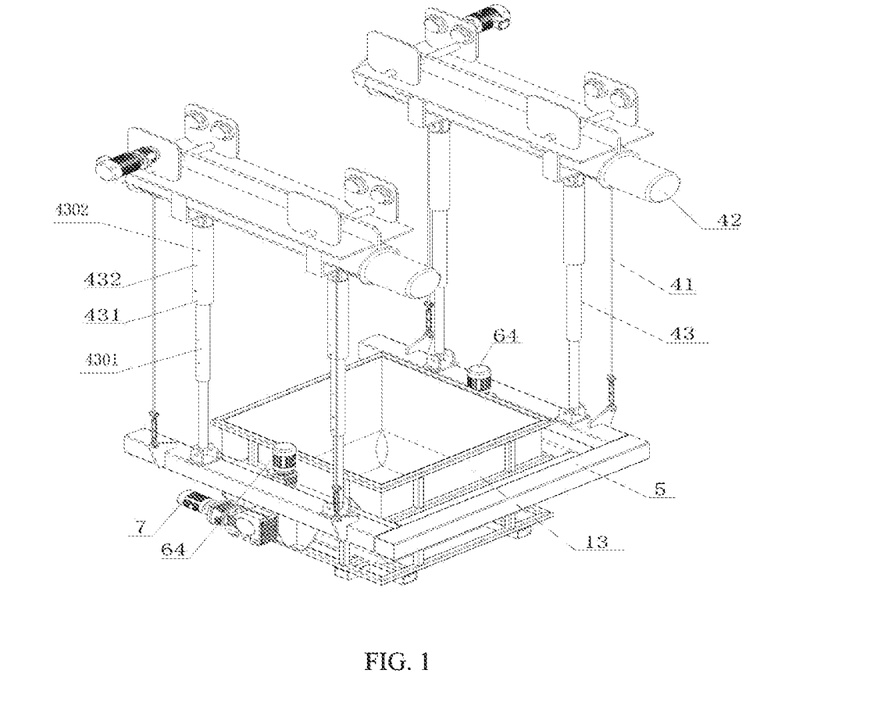
FIG. 1 is a schematic diagram of a discharging device for a vinasse tank in embodiment 1 of the present invention.
Figure 2:
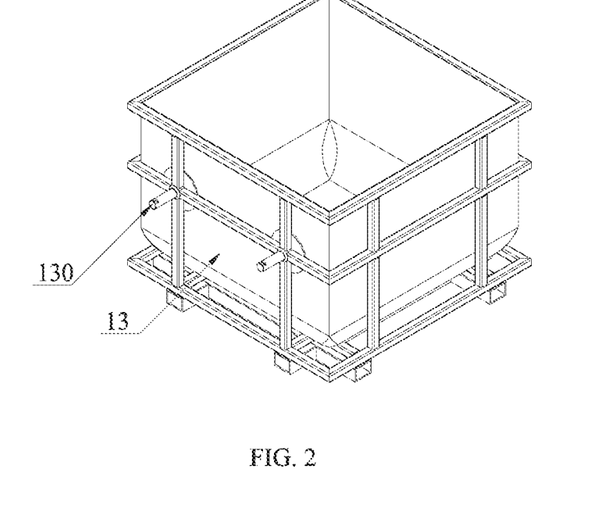
FIG. 2 is a stereogram of a vinasse tank in embodiment 1 of the present invention.
Figure 3:
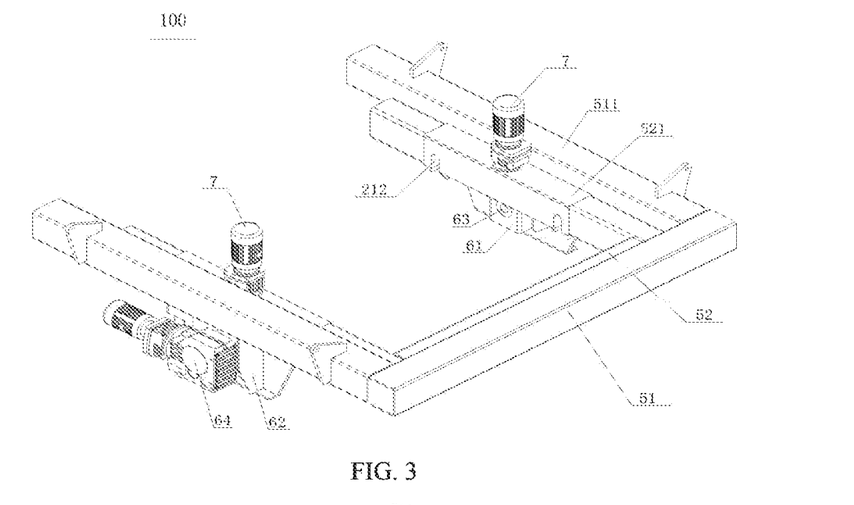
FIG. 3 is a stereogram of a flipping component in embodiment 1 of the present invention.
Figure 4:
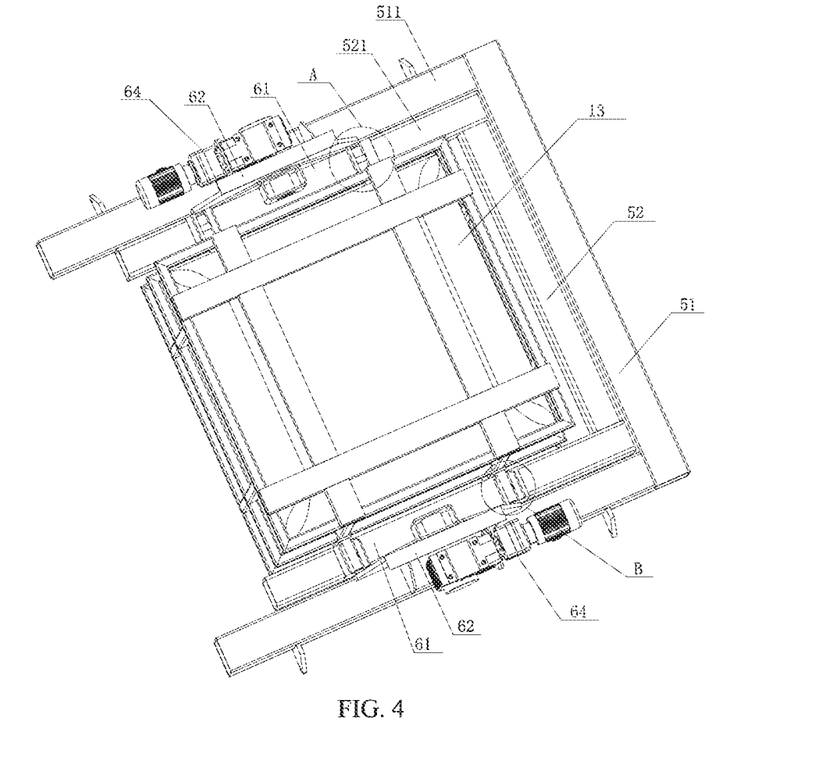
FIG. 4 is a bottom view of a flipping component in embodiment 1 of the present invention.

The lifting component 200 includes a large vehicle, a small vehicle 11, a sling 41 connected with the outer frame 51, a hoist 42 for driving the sling 41 to rise and fall, and an anti-shake device to prevent the vinasse tank 13 from shaking in a lifting process. The anti-shake device is a telescopic connecting rod 43. An outer rod 4301 at a telescopic position of the telescopic connecting rod 43 is provided with a plurality of buckle circles 431 distributed along the axial direction of the outer rod; and an inner rod 4302 is provided with a plurality of convex balls 432 distributed along the axial direction of the inner rod and matched with the buckle circles 431. Each of the outer supporting rods 511 is provided with two telescopic connecting rods 43.

Figure 5:
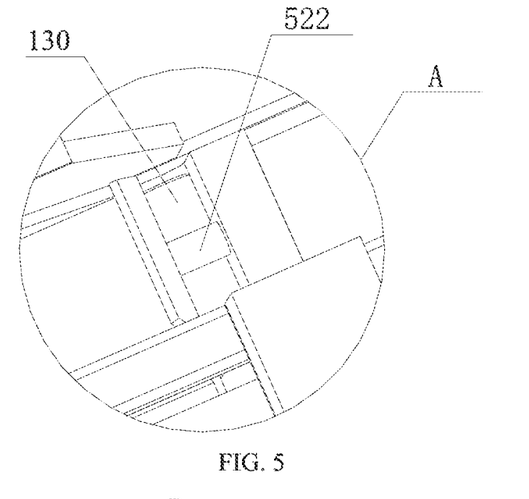
FIG. 5 is an enlarged view at A in FIG. 4.
Figure 6:
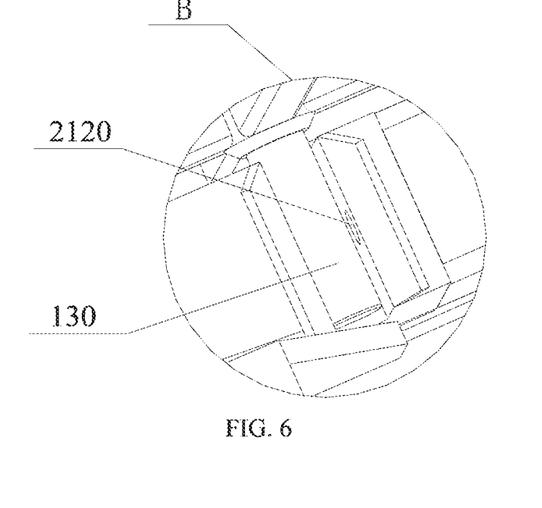
FIG. 6 is an enlarged view at B in FIG. 4.

The first driving mechanism 300 includes a first sensor arranged on a top wall of the C-shaped groove 212, a controller, and a second sensor and a first motor 7 which are connected with the gear lever 522.

Figure 7:
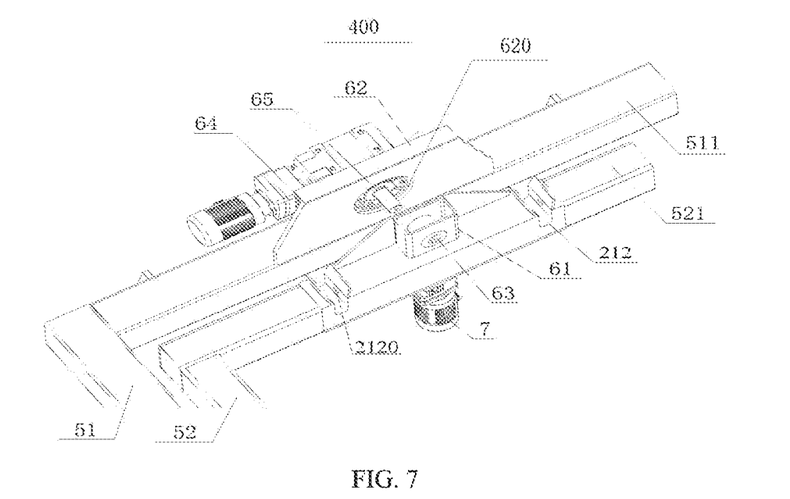
FIG. 7 is a stereogram of a second driving mechanism in embodiment 1 of the present invention.
Figure 8:
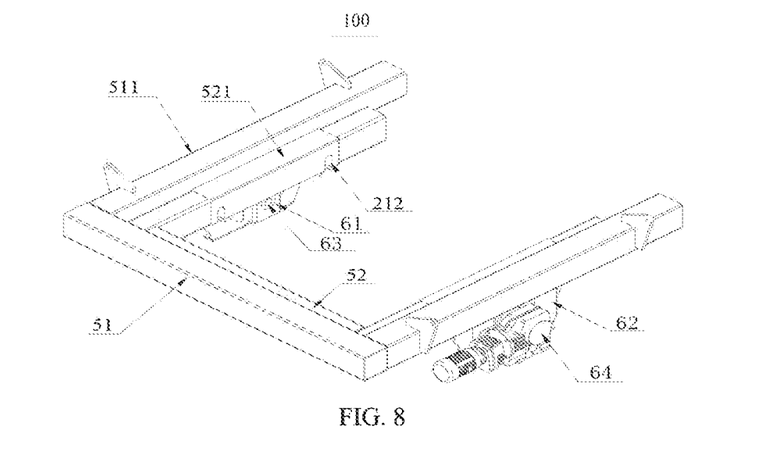
FIG. 8 is a stereogram of a flipping component in embodiment 2 of the present invention.

As shown in FIG. 7, the second driving mechanism 400 includes a first supporting seat 61 arranged on the inner supporting rod 521, a second supporting seat 62 arranged on the outer supporting rod 511, and a second motor 64 arranged on the outer supporting rod 511; the first supporting seat 61 is provided with a keyway hole 63; the second supporting seat 62 is provided with a through hole; and a transmission shaft 65 of the second motor 64 penetrates through the through hole 620 and then is in key connection with the keyway hole 63.

Embodiment 2

Compared with embodiment 1, the discharging device for the vinasse tank of the present embodiment has the following differences: as shown in FIG. 8 to FIG. 11, the C-shaped groove 212 also includes a second through hole penetrating through the top wall; and the first driving mechanism 300 includes a lower movable rod 221 with a lower end passing through the second through hole, a lower end pressure structure 23 connected with the upper end of the lower movable rod 221, an upper movable rod 222, an upper end pressure structure 24 arranged on the upper movable rod 222 and capable of rotating and moving up and down, an elastic component 223, a locking structure 25, a transmission structure, and a straight toothed rod 228 penetrating through the first through hole 2120.

Figure 9:
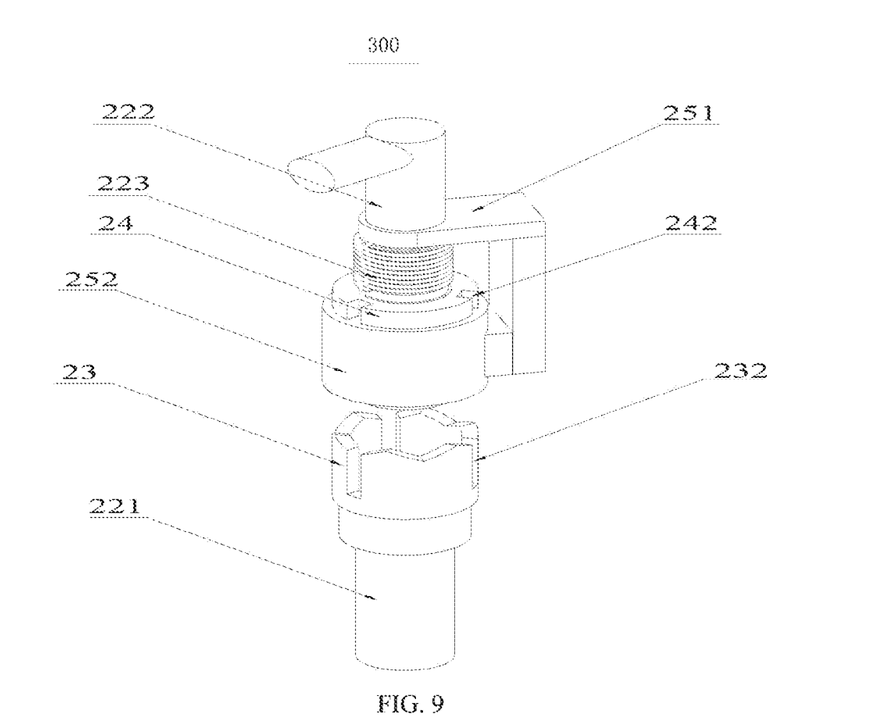
FIG. 9 is a schematic diagram of a partial structure of a first driving mechanism in embodiment 2 of the present invention.

The transmission structure includes a primary connecting rod 224, a secondary connecting rod 225, a driving gear 226 and a driven acceleration gear 227 which are sequentially connected with the upper end of the upper movable rod 222. The driven acceleration gear 227 is engaged with the straight teeth rod 228.

Figure 10:
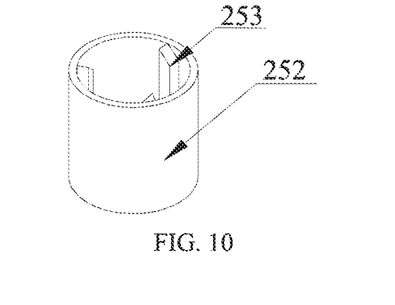
FIG. 10 is a structural schematic diagram of a locking structure of a first driving mechanism in embodiment 2 of the present invention.

The locking structure 25 includes a fixing part 251 that restricts the upward movement of the elastic component 223, a sleeve 252 arranged outside the upper end pressure structure 24 and the lower end pressure structure 23, and convex strips 253 arranged on an inner wall of the sleeve 252 and installed along the axial direction of the upper movable rod 222. The tops of the convex strips 253 are reference oblique surfaces. Three convex strips 253 are evenly distributed.

As shown in FIG. 11 to FIG. 17, the lower end pressure structure 23 includes three first matching end surfaces 231. A first strip-shaped hole 232, which is arranged along the axial direction of the lower end pressure structure 23, communicated with the first matching end surfaces 231 and matched with the width of the convex strips 253, is formed between two adjacent first matching end surfaces 231. The first matching end surfaces 231 are jagged.

The upper end pressure structure 24 includes three second matching end surfaces 241 matched with the first matching end surfaces 231. A second strip-shaped groove 242, which is arranged along the axial direction of the upper end pressure structure 24, communicated with the second matching end surfaces 241 and matched with the width of the convex strips 253, is formed between two adjacent second matching end surfaces 241. Each of the second matching end surfaces 241 includes a first oblique surface 2411, a vertical surface 2412 and a second oblique surface 2413 which are connected in sequence. The first oblique surface 2411 and the second oblique surface 2413 are arc surfaces. The length of the second oblique surface 2413 is shorter than the length of the first oblique surface 2411.

Figure 11:
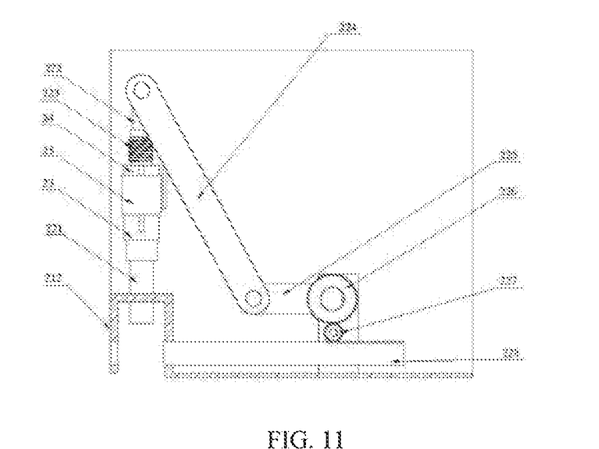
FIG. 11 is a structural schematic diagram of an unlocking state of a first driving mechanism in embodiment 2 of the present invention.
Figure 12:
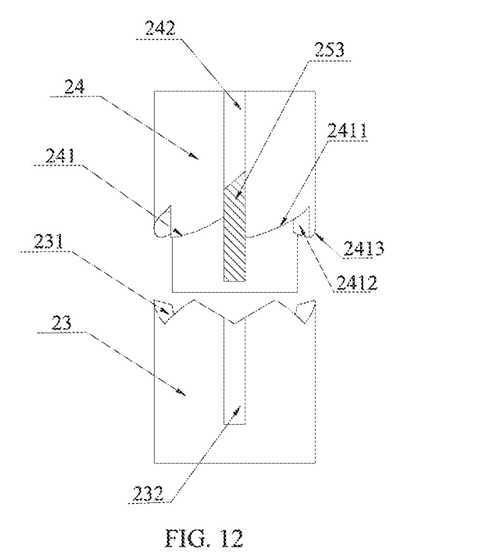
FIG. 12 is a local schematic diagram of an unlocking state of a first driving mechanism in embodiment 2 of the present invention.

The locking process and the unlocking process are as follows:

Unlocking state: as shown in FIG. 11 to FIG. 12, the convex strip 253 is located in the second strip-shaped groove 242, and the first strip-shaped hole 232 and the second strip-shaped groove 242 are coaxial.

Figure 13:
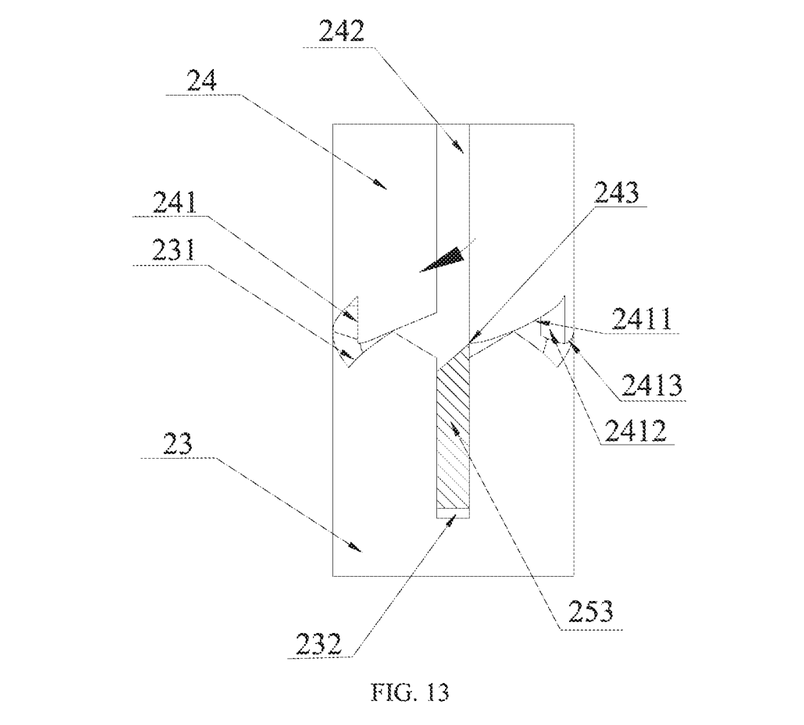
FIG. 13 is a local schematic diagram of a first driving mechanism that changes from an unlocking state to a locking state in embodiment 2 of the present invention.

Change from the unlocking state to the locking state: as shown in FIG. 13, the lifting component 200 is used to control the frame 521 to move downwards, so that the convex rod 130 upwards extrudes the lower movable rod 221, thereby driving the lower end pressure structure 23 to upwards extrude the upper end pressure structure 24. Due to the deformation of a spring and the stationary state of the convex strip 253, the convex strip 253 moves towards the first strip-shaped hole 232 relative to the upper end pressure structure 24. When the convex strip 253 moves to the first critical point 243, because there is no limitation of the convex strip 253, the upper end pressure structure 24 rotates, so that the convex strip 253 moves along the first oblique surface 2411.

Figure 14:
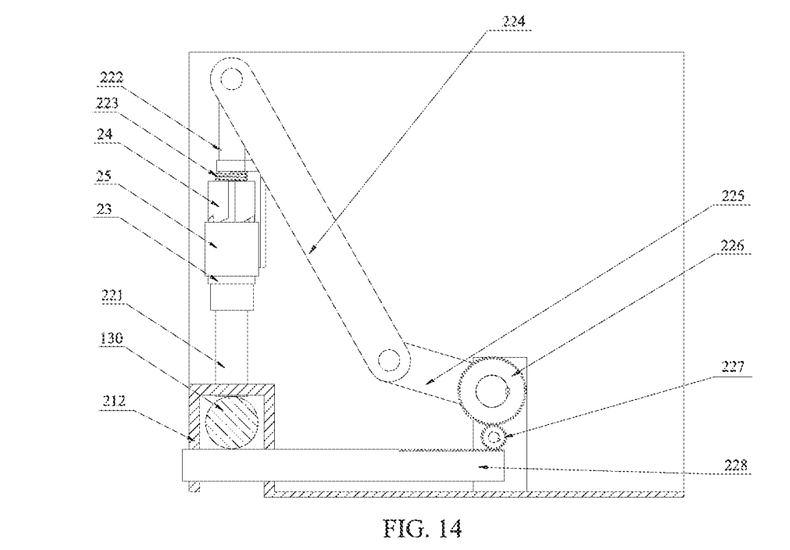
FIG. 14 is a structural schematic diagram of a locking state of a first driving mechanism in embodiment 2 of the present invention.
Figure 15:
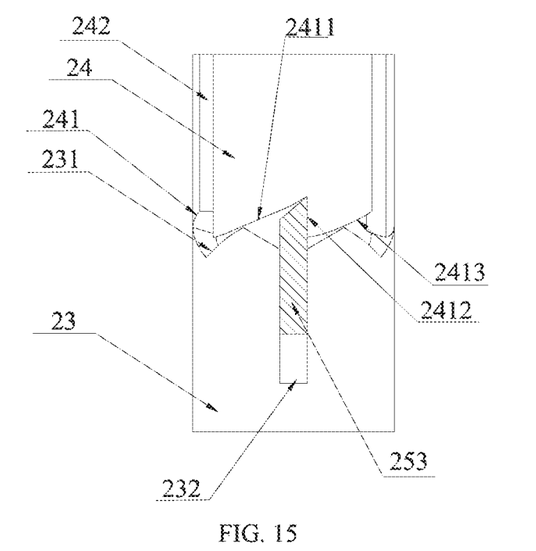
FIG. 15 is a local schematic diagram of a locking state of a first driving mechanism in embodiment 2 of the present invention.

Locking state: when the convex strip 253 moves between the first oblique surface 2411 and the vertical surface 2412, due to the limitation of the vertical surface 2412, the upper end pressure structure 24 stops rotating. At this time, the straight toothed rod 228 moves to the left to intersect with the convex rod 130 to complete the locking, as shown in FIG. 14 to FIG. 15.

Figure 16:
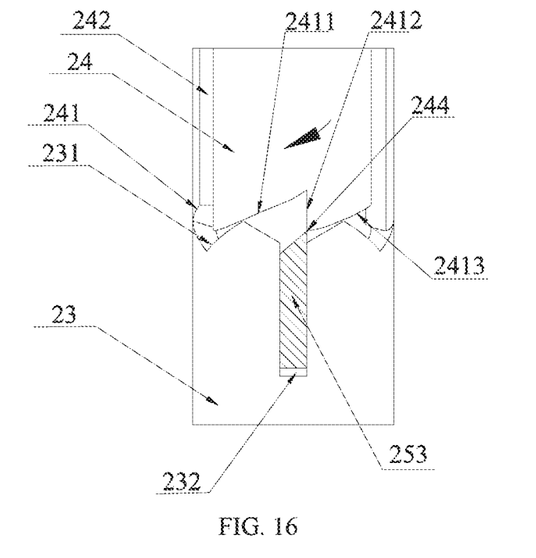
FIG. 16 is a local schematic diagram of a first driving mechanism that changes from a locking state to an unlocking state in embodiment 2 of the present invention (moving to a second critical point)
Figure 17:
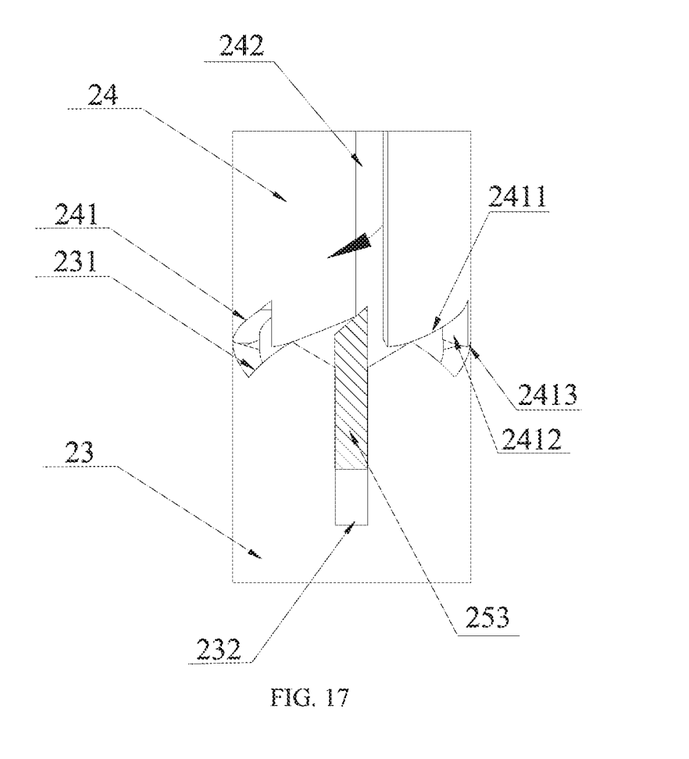
FIG. 17 is a local schematic diagram of a first driving mechanism that changes from a locking state to an unlocking state in embodiment 2 of the present invention (moving to a second strip-shaped groove).

Change from the locking state to the unlocking state: as shown in FIG. 16 to FIG. 17, the lifting component 200 is used to control the frame 521 to move downwards, so that the convex rod 130 upwards extrudes the lower movable rod 221, thereby driving the lower end pressure structure 23 to upwards extrude the upper end pressure structure 24. Due to the deformation of the spring and the stationary state of the convex strip 253, the convex strip 253 moves towards the first strip-shaped hole 232 relative to the upper end pressure structure 24. When the convex strip 253 moves to the second critical point 244, because there is no limitation of the convex strip 253, the upper end pressure structure 24 rotates, so that the convex strip 253 moves along the second oblique surface 2413.

Unlocking state: when the convex strip 253 moves into the second strip-shaped groove 242, due to the limitation of the second strip-shaped groove 242, the upper end pressure structure 24 stops rotating. At this time, the straight toothed rod 228 moves to the right to separate from the convex rod 130 to complete the unlocking, as shown in FIG. 12 to FIG. 13.

The related content of the present invention is described above. Those ordinary skilled in the art will realize the present invention based on the illustration. Based on the above content of the present invention, all other embodiments obtained by those ordinary skilled in the art without contributing creative labor shall belong to the protection scope of the present invention.

We claim:

1. A discharging device for a vinasse tank, comprising a flipping component (100) and a lifting component (200), wherein the flipping component comprises a group of convex rods (130) externally connected with a group of opposite side surfaces of a vinasse tank (13), and a frame (5) matched with the shape of the vinasse tank (13); the frame (5) comprises an outer frame (51) and an inner frame (52); a group of opposite inner supporting rods (521) of the inner frame (52) are provided with C-shaped grooves (212) having openings downward and opening sizes matched with the convex rods (130); each of the C-shaped grooves (212) comprises a first through hole (2120) penetrating through the lower parts of the groove walls on both sides; a gear lever (522) matched with the size of the first through hole (2120) and a first driving mechanism (300) for driving the gear lever (522) to move left and right along an axial direction of the first through hole (2120) are arranged in the inner supporting rod (521); and a second driving mechanism (400) for driving the inner frame (52) to flip is arranged at a joint between the inner supporting rod (521) of the inner frame (52) and an outer supporting rod (511) of the outer frame (51).

2. The discharging device for the vinasse tank according to claim 1, wherein the second driving mechanism (400) comprises a first supporting seat (61) arranged on the inner supporting rod (521), a second supporting seat (62) arranged on the outer supporting rod (511), and a second motor (64) arranged on the outer supporting rod (511); the first supporting seat (61) is provided with a keyway hole (63); the second supporting seat (62) is provided with a through hole (620); and a transmission shaft (65) of the second motor (64) penetrates through the through hole (620) and then is in key connection with the keyway hole (63).

3. The discharging device for the vinasse tank according to claim 1, wherein the first driving mechanism (300) comprises a first sensor arranged on a top wall of the C-shaped groove (212), a controller, and a second sensor and a first motor (7) which are connected with the gear lever (522).

4. The discharging device for the vinasse tank according to claim 1, wherein two first driving mechanisms and two C-shaped grooves (212) are respectively arranged on the group of opposite inner supporting rods (521); and two groups of convex rods (130) are arranged.

5. The discharging device for the vinasse tank according to claim 1, wherein the lifting component comprises a large vehicle, a small vehicle (11), a sling (41) connected with the outer frame (51), and a hoist (42) for driving the sling (41) to rise and fall.

6. The discharging device for the vinasse tank according to claim 1, further comprising an anti-shake device to prevent the vinasse tank (13) from shaking in a lifting process.

7. The discharging device for the vinasse tank according to claim 6, wherein the anti-shake device is a telescopic connecting rod (43).

8. The discharging device for the vinasse tank according to claim 7, wherein an outer rod (4301) at a telescopic position of the telescopic connecting rod (43) is provided with a plurality of buckle circles (431) distributed along the axial direction of the outer rod; and an inner rod (4302) is provided with a plurality of convex halls (432) distributed along the axial direction of the inner rod and matched with the buckle circles (431).

9. The discharging device for the vinasse tank according to claim 8, wherein the outer supporting rod (511) is provided with at least two telescopic rods (43).

* * * * *